US008180838B2

(12) United States Patent
Tan

(10) Patent No.: US 8,180,838 B2
(45) Date of Patent: May 15, 2012

(54) EFFICIENTLY MANAGING MODULAR DATA STORAGE SYSTEMS

(75) Inventor: Kee Hern Tan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 929 days.

(21) Appl. No.: 12/202,092

(22) Filed: Aug. 29, 2008

(65) Prior Publication Data
US 2010/0058023 A1 Mar. 4, 2010

(51) Int. Cl.
*G06F 15/16* (2006.01)
(52) U.S. Cl. ........................................................ 709/206
(58) Field of Classification Search .................. None
See application file for complete search history.

(56) References Cited

U.S. PATENT DOCUMENTS

| | | | |
|---|---|---|---|
| 6,336,134 B1 | 1/2002 | Varma | |
| 6,732,149 B1* | 5/2004 | Kephart | 709/206 |
| 6,732,157 B1* | 5/2004 | Gordon et al. | 709/206 |
| 6,920,460 B1 | 7/2005 | Srinivasan et al. | |
| 7,035,851 B1 | 4/2006 | Sinclair et al. | |
| 7,228,306 B1 | 6/2007 | Altman et al. | |
| 7,725,544 B2* | 5/2010 | Alspector et al. | 709/206 |
| 2004/0073617 A1* | 4/2004 | Milliken et al. | 709/206 |
| 2004/0107259 A1* | 6/2004 | Wallace et al. | 709/206 |
| 2004/0117451 A1* | 6/2004 | Chung | 709/207 |
| 2004/0215977 A1* | 10/2004 | Goodman et al. | 713/201 |
| 2005/0015455 A1* | 1/2005 | Liu | 709/207 |
| 2005/0044153 A1* | 2/2005 | Gross | 709/206 |
| 2005/0050363 A1 | 3/2005 | Naka et al. | |
| 2005/0081059 A1* | 4/2005 | Bandini et al. | 713/201 |
| 2005/0097179 A1* | 5/2005 | Orme | 709/207 |
| 2006/0095521 A1* | 5/2006 | Patinkin | 709/206 |
| 2006/0168056 A1* | 7/2006 | Gandhi et al. | 709/206 |
| 2006/0190243 A1 | 8/2006 | Barkai et al. | |
| 2006/0282457 A1 | 12/2006 | Williams | |

OTHER PUBLICATIONS

"An E-mail Filtering Approach Using Neural Network," by Cao et al. In: Lecture Notes in Computer Science, 2004, vol. 3174/2004, 29-49. Available at: SpringerLink.*
"An Email Classifier Based on Resemblance," by Poon and Chang. In: Lecture Notes in Computer Science, 2003, vol. 2871/2003, 344-348. Available at: SpringerLink.*
"Naive-Bayes vs. Rule-Learning in Classification of Email," by Provost, Jefferson. In:Technical Report AI-TR-99-284, University of Texas at Austin, Artificial Intelligence Lab, 1999. Available at: http://citeseerx.ist.psu.edu/viewdoc/download?doi=10.1.1.18.3844&rep=rep1&type=pdf.*

(Continued)

*Primary Examiner* — Neveen Abel Jalil
*Assistant Examiner* — Daniel Kinsaul
(74) *Attorney, Agent, or Firm* — Workman Nydegger

(57) ABSTRACT

The management of a data storage system. The system may store data objects that are subject to change in container sets. The data storage system uses location maps to map the data objects to a corresponding container. When there has been, or will be, a change in the availability of containers, a new location map is created which maps the data objects to a new potentially overlapping set of containers. New data objects are added to the new set of containers, and a data object is found by searching all location maps. As an alternative or as an addition to this system, data objects may be stored in a manner that they may be efficiently removed when a condition is met. A container is created which stores all data objects to be removed when the condition occurs. When the condition occurs, the container is removed.

11 Claims, 14 Drawing Sheets

OTHER PUBLICATIONS

DB2 Partitioning Features (10 pages) http://www.ibm.com/developerworks/db2/library/techarticle/dm-0608mcinerney/index.html (Aug. 3, 2006).

To Set the Automatic Message Removal (Expire and Purge) Feature (9 pages) http://docs.sun.com/app/docs/doc/819-2650/6n4u4dttr?a=view (Copyright 1994-2008).

* cited by examiner

| Location Map 521B | | |
|---|---|---|
| Start | End | Container |
| A | M | 511A |
| N | Z | 511B |

| Location Map 521C | | |
|---|---|---|
| Start | End | Container |
| A | G | 511A |
| H | P | 511B |
| Q | Z | 511C |

| Location Map 521C | | |
|---|---|---|
| Start | End | Container |
| A | G | 511A |
| H | P | 511B |
| Q | Z | 511C |

| Location Map 521F | | |
|---|---|---|
| Start | End | Container |
| A | M | 511A |
| N | Z | 511B |

| Location Map 521F | | |
|---|---|---|
| Start | End | Container |
| A | M | 511A |
| N | Z | 511B |

| Mapping Table 910 | |
|---|---|
| Container | Condition |
| 920A | 930A |

900A

| Mapping Table 910 | |
|---|---|
| Container | Condition |
| 920A | 930A |
| 920B | 930B |
| ... | ... |
| 920n | 930n |

900B

| Mapping Table 910 | |
|---|---|
| Container | Condition |
| 920B | 930B |

900C

EFFICIENTLY MANAGING MODULAR DATA STORAGE SYSTEMS

BACKGROUND

Computing systems are capable of generating vast amounts of data. Often, it is desirable to store this data in a data store for later access. The characteristics for the data store may vary based on the type of data which is stored. For example, in some situations the data is to be stored permanently, while in other situations the data expires and is removed from the data store after certain conditions are met. Further, the storage space used to store the data may remain constant or vary over time.

To facilitate the management of data, some administrators design data stores modularly, using a number of physical or logical storage containers. Then, if the size of the data increases, the administrator may add one or more containers to the data store to increase the available storage space. In that case, the administrator may optionally distribute the existing data across the new containers. On the other hand, if the size of the data decreases, the administrator might move data off one or more containers. This would provide the administrator with the option to remove the unused containers from the data store.

Modular data stores have made significant contributions to easing the administrative burden of storing large amounts of data. However, they do have limitations. For example, when data is distributed across multiple storage containers, it may be difficult to quickly locate for access or removal. To solve this problem, existing data stores may use a map to store a mapping of a full range of hash values which are distributed across the storage containers.

To store data in the data store, a hashing function is used to hash a known portion of the data and then the map is used to determine which container corresponds to the hash. The container corresponding to the hash stores the data that was used to generate the hash. To look up the data, the hashing function is used to hash the known portion again, and then the map is used to locate the container in which it is deterministically stored in accordance with the map. To add or remove a container to a hash-based data store, an administrator may generate a new map corresponding to the new set of containers. The administrator may then copy data among the containers if the new map causes a hash to map to a different container than it did previously.

SUMMARY

Embodiments described herein relate to efficiently managing modular data storage systems. A modular data storage system might be made up of a set of containers which store data objects. The number and total size of the data objects may increase or decrease, and some data objects may need to be removed when certain conditions are met.

In one embodiment, one or several location map(s) may keep an index of which container(s) currently store the data objects. The location map(s) may deterministically map each data object to a specific container. Thus, a new data object might be stored in a container specified by the location map(s).

If it is determined that the set of containers available in the data store has changed or is about to change, a new location map may be created to reflect a new set of containers. The new set of containers might contain completely different containers than the original set of containers, or the new set of containers might overlap with the original set of containers such that some containers may exist in both sets. Once a new location map is created, new data objects might be stored according to that map, which stores the data objects in the new set of containers.

Searching for a data object may be performed by using the original location map(s) to determine whether the data object is stored in the original set of containers. Additionally, the new location map might be used to determine whether the data object is stored in the new set of containers.

In another embodiment, which may, but need not, be implemented in conjunction with the foregoing embodiment, it might be determined before storing a data object whether it is desirable to remove the data object when a condition is met. If so, it may be determined whether a container exists for storing the data object as well as any other data objects which may be removed according to the condition; if the container does not exist, it may be created. Once the container is created or it is determined to already exist, the data object might be stored in the container. Then, if it is determined that the condition has been met, the container may be removed-thereby removing all data objects which have been stored in the container according to the condition.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a mechanism is described for storing data objects in a modular data storage system which is capable of expanding and diminishing its size gracefully and without interrupting access to data. Also, a mechanism is described for storing multiple data objects within the modular data storage system wherein the data objects may be removed together in a manner that is less time- and computationally-intensive than removing each data object individually. First, some introductory discussion regarding a computing system in which the principles described herein may be employed will be described with respect to FIG. 1. Then, various embodiments of the matching and testing mechanisms will be described with respect to FIGS. 2 through 10.

Figure 1:
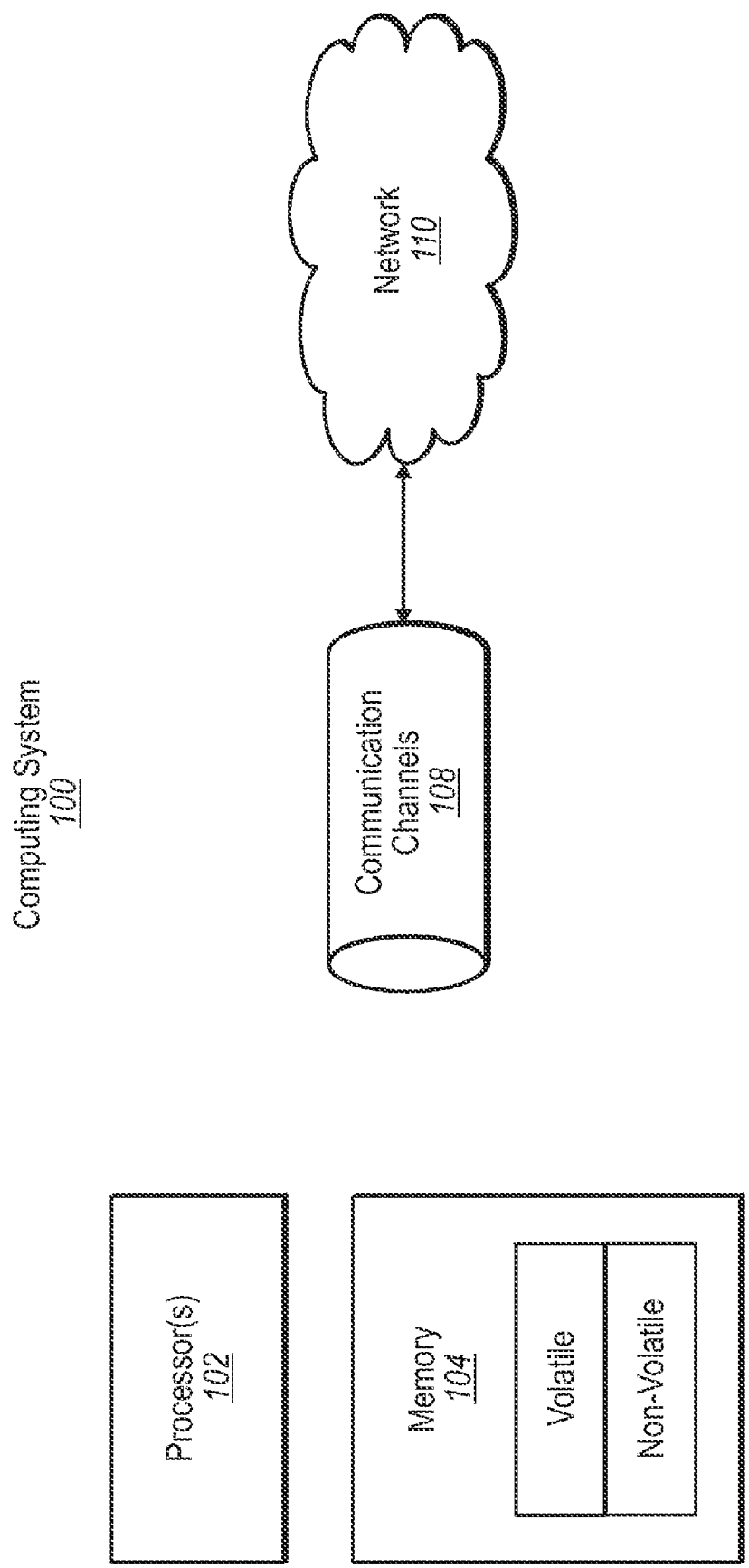
FIG. 1 illustrates an example computing system that may be used to employ embodiments described herein.

FIG. 1 illustrates a computing system, which may implement a modular data storage system. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

The memory 104 may comprise one or more containers. As used herein, the term "container" can refer to any physical or virtual storage unit. For example, and not to limitation, a container might comprise physical media such as hard disk drive, a physical partition on a hard disk drive, a solid state disk, an optical disk, or any other physical storage media. Further, and not to limitation, a container may comprise abstracted or virtual media such as a file system, a file, a virtual volume, a table in a database, a network-attached volume, or any other virtual or abstracted storage media. Containers may exist within a single computing system or they may span multiple computing systems. Further, containers may be nested and exist within other containers.

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
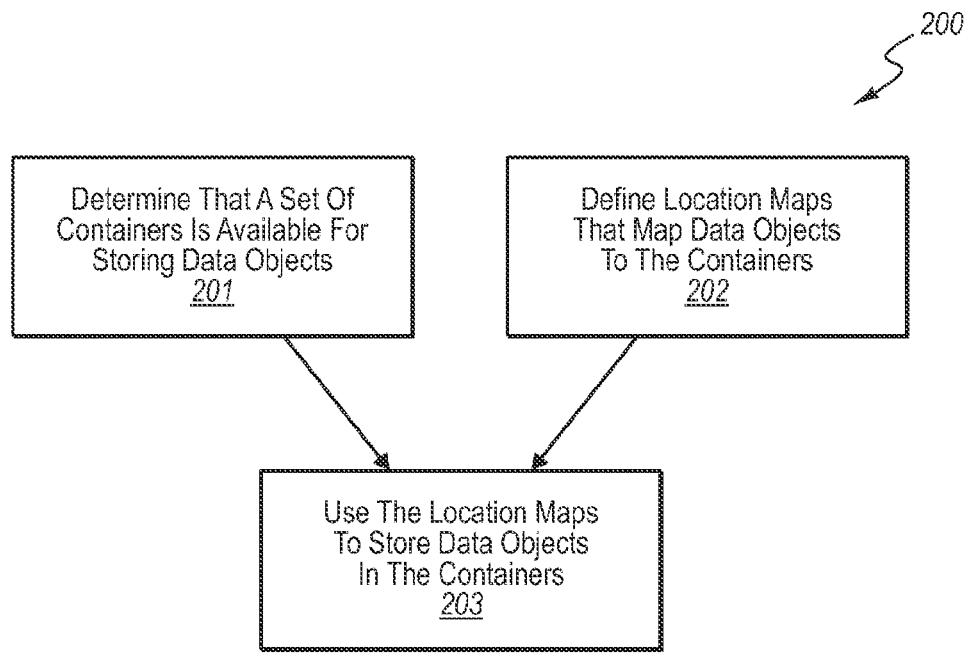
FIG. 2 illustrates a flowchart of a method for storing data objects in a modular data storage system.

FIG. 2 illustrates a flowchart of a method 200 of efficiently storing data objects within a modular data storage system, and represents just one method for storing data objects consistent with the principles described herein. For example, the method 200 includes the determination that a set of containers is available for storing data objects (act 201). The set of containers may include a single container or they may include multiple containers. Further, the data objects may be a static set of data objects, and/or they may be a dynamic set of data objects such that the number, type, identity, or content of the data objects may be subject to change.

As part of the method 200, location maps are defined that map the data object to the container (act 202). This defining of location maps (act 202) is shown in parallel with the determination that a set of container is available for storing data objects (act 201) in order to emphasize that there is no mandatory ordering relationship between these acts. One could occur before the other, after the other, and/or concurrent with the other, without affecting the broader principles described herein. The location maps may be a single location map, or perhaps multiple location maps. The location maps determine in which container each data object should be stored. In one embodiment, the location maps deterministically map the data objects to the containers. That is, each data object may map to a single container only.

In accordance with FIG. 2, the location maps may then be used to store the data objects on the set of containers (act 203). For example, to store each data object, the method might use the location maps to determine a container on which to store the data object, and then the method might store the data object on that container.

Figure 5A:
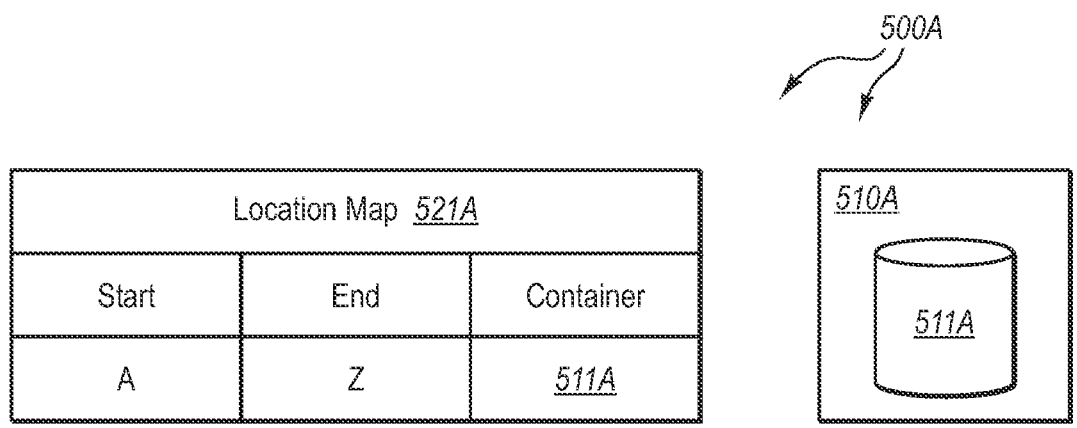
FIG. 5A illustrates an embodiment of a modular data storage system that uses location maps.

To further illustrate the method 200, attention is now directed to FIG. 5A which illustrates one of many possible embodiments of a modular data storage system. In one embodiment, a modular data storage system stores data objects which might be, for example, e-mail messages. In addition, the location maps might comprise hash maps which use a hash of an e-mail address to determine a container in which to store the e-mail message. For example, in the case, a hashing function associated with the hash maps perhaps generates a finite set of hash values, and the hash maps might then map the entire set of hash values across the available containers. That said, e-mail messages are only one possible type of data object that might be stored on the modular data storage system. Further, a hash map is only one possible type of location map to use with the modular data storage system. Accordingly, a modular data storage system in accordance with the embodiments described herein may store a variety of types of data objects and may use a variety of methods to implement a location map.

FIG. 5A first shows an initial stage 500A of a modular data storage system which defines only a single container 511A in a set of containers 510A. In this embodiment, a location map 521A maps a full range of hash values comprising twenty-six hash values A through Z. One skilled in the art will recognize that more complicated hashing functions may be desirable. Because there is only a single container 511A in the set of containers 510A, the location map 521A might map all twenty-six hash values A through Z to the single container 511A. In this case, a single location map is shown. However, in some embodiments, the modular data storage system may begin with more than one location map.

At times, the storage capacity of the modular data storage system may expand or diminish. For example, if the size or number of the data objects stored on the modular data storage system grows too large, there may be insufficient space available on container 511A to store any additional data objects. Likewise, if the size or number of the data objects has diminished, there may be an opportunity to recover storage containers. As such, FIG. 3 illustrates one embodiment of a method 300 for responding to a change in the availability of containers.

Figure 3:
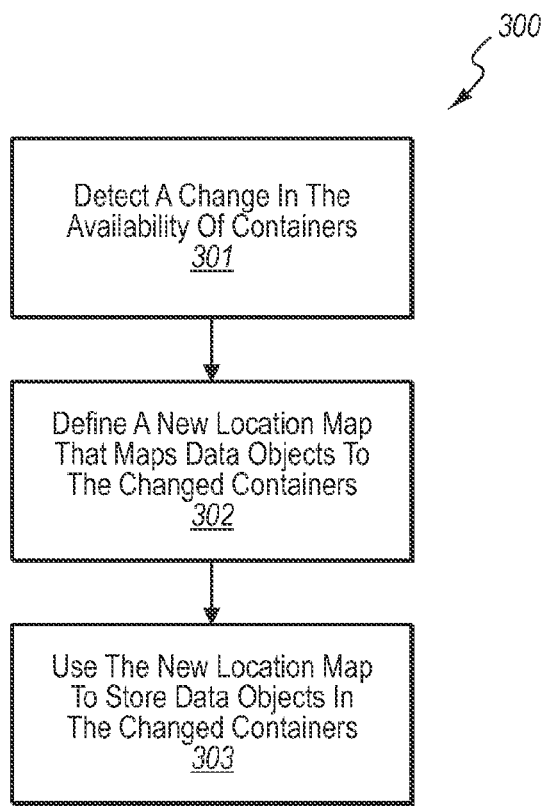
FIG. 3 illustrates a flowchart of a method for extending or diminishing a data storage system.

The method 300 as illustrated in FIG. 3 includes the detection that there is a change in the availability of containers (act 301). This detection may be responsive or predictive. That is, the detection may (in the responsive case) be that the number of available containers has already changed, or (in the predictive case) that the number of available containers has a reasonable likelihood of changing in the future.

Figure 5B:
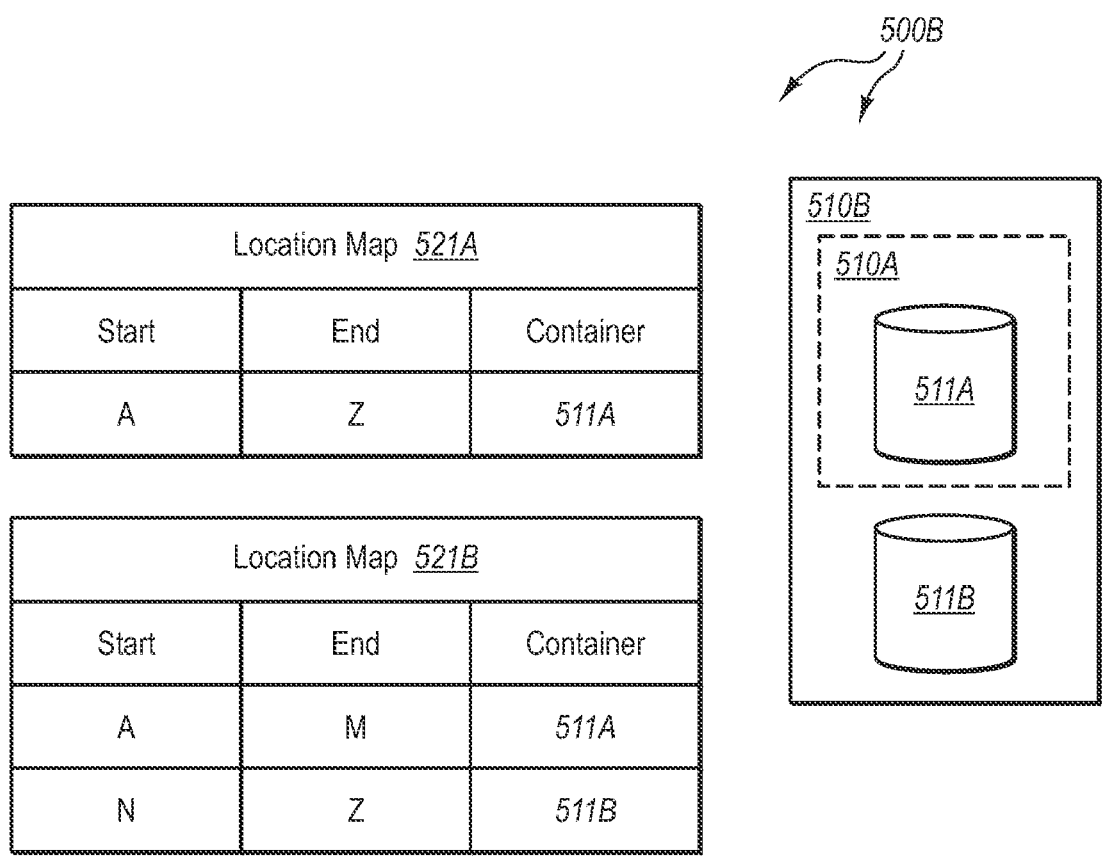
FIG. 5B illustrates an embodiment of extending the size of a modular data storage system that uses location maps.

Accordingly, FIG. 5B illustrates a second stage 500B of the modular data storage system wherein the number of available containers has increased. For example, building on the first stage 500A of the modular data storage system of FIG. 5A, the original set of containers 510A (which includes only the single container 511A) has been expanded to a new set of containers 510B that includes both the containers 511A and 511B. As shown, the new set of containers 510B overlaps with the original set of containers 510A. However, the overlapping of a new set of containers with an old set of containers is not necessary in the broader sense. For example, in some embodiments, the new set of containers 510B may exist completely independent of the original set of containers 510A.

Returning to FIG. 3, after detecting the change in the availability of the containers (an expansion of the available set comparing FIG. 5A to FIG. 5B), the method 300 next defines a new location map that maps data objects to the new set of containers. The defining the new location map (act 302) may occur before or after the availability of containers actually changes. In one embodiment, the new location map might map the new set of containers to a set of containers that is completely distinct from the original set of containers. That is, there might be no overlap between the original set of containers and the new set of containers. In another embodiment, the new location map might map the new set of containers such that they overlap with the original set of containers in whole or in part. In yet another embodiment, the new location map might map the new set of containers such that they are a subset of the original set of containers. For example, in the case where the storage capacity of the modular data storage system may be diminished, the new set of containers may comprise a subset of the original set of containers.

In some embodiments, such as embodiments which use a hash map as a location map, the new location map distributes the range of hash values differently than the original location map. For example, if the number of available containers has increased from one to two, and if both containers are in the new set of containers, then the range of hash values might now be distributed perhaps evenly across the two containers instead of being distributed to a single container only.

Referring back to FIG. 5B, the second stage 500B shows a modular data storage system that has responded to the increase in the availability of containers by adding a new location map 521B. As illustrated, the new location map 521B now maps the range of hash values A through Z across both containers 511A and 511B. Also as illustrated, the new location map 521B exists as a location map that is separate and distinct from the original location map 521A. This separation is not necessary, and in some embodiments the two location maps may exist together. For example, the location maps may be implemented with database tables. In that case, the location maps might, but need not, exist in two distinct tables.

Once the new location map is defined (act 302), the new location map is used to store data objects in the new set of containers (act 303). At times, the new location map be exclusively used to store new data objects. At other times, the new location map and the old location maps may be used to store new data objects.

Figure 5C:
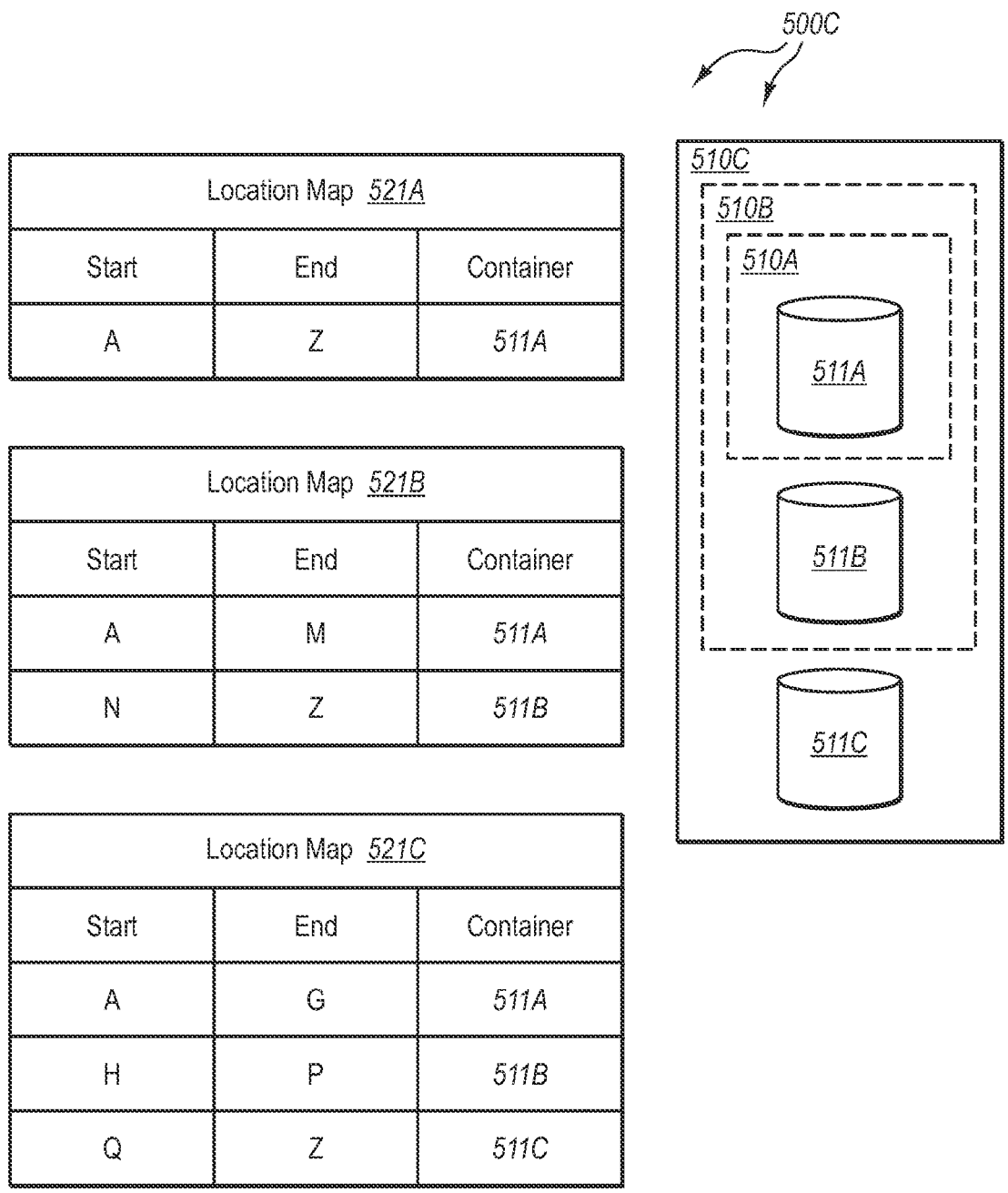
FIG. 5C illustrates an embodiment of extending the size of a modular data storage system that uses location maps.

The method 300 may be performed each time the set of containers changes. That is, each time the set of containers changes a new location map might be added to the modular data storage system. For example, FIG. 5C illustrates a third state 500C of the modular data storage system wherein yet another container 511C has been added to the modular data storage system. Here, a new set of containers 510C now includes containers 511A, 511B, and 511C. The method 300 has added a new location map 521C which maps the range twenty-six hash values A through Z across all the containers 511A, 511B, and 511C.

By using new location maps to respond to a change in the availability of containers, the method 300 allows a modular data storage system to be expanded or diminished without requiring that data be copied among the containers to adapt to the change. This allows an administrator to modify the size of the modular data storage system without interrupting access to the data stored in the modular data storage system. In order to accomplish this, however, perhaps up to all location maps may be searched together to locate a data object stored on the modular data storage system.

Figure 4:
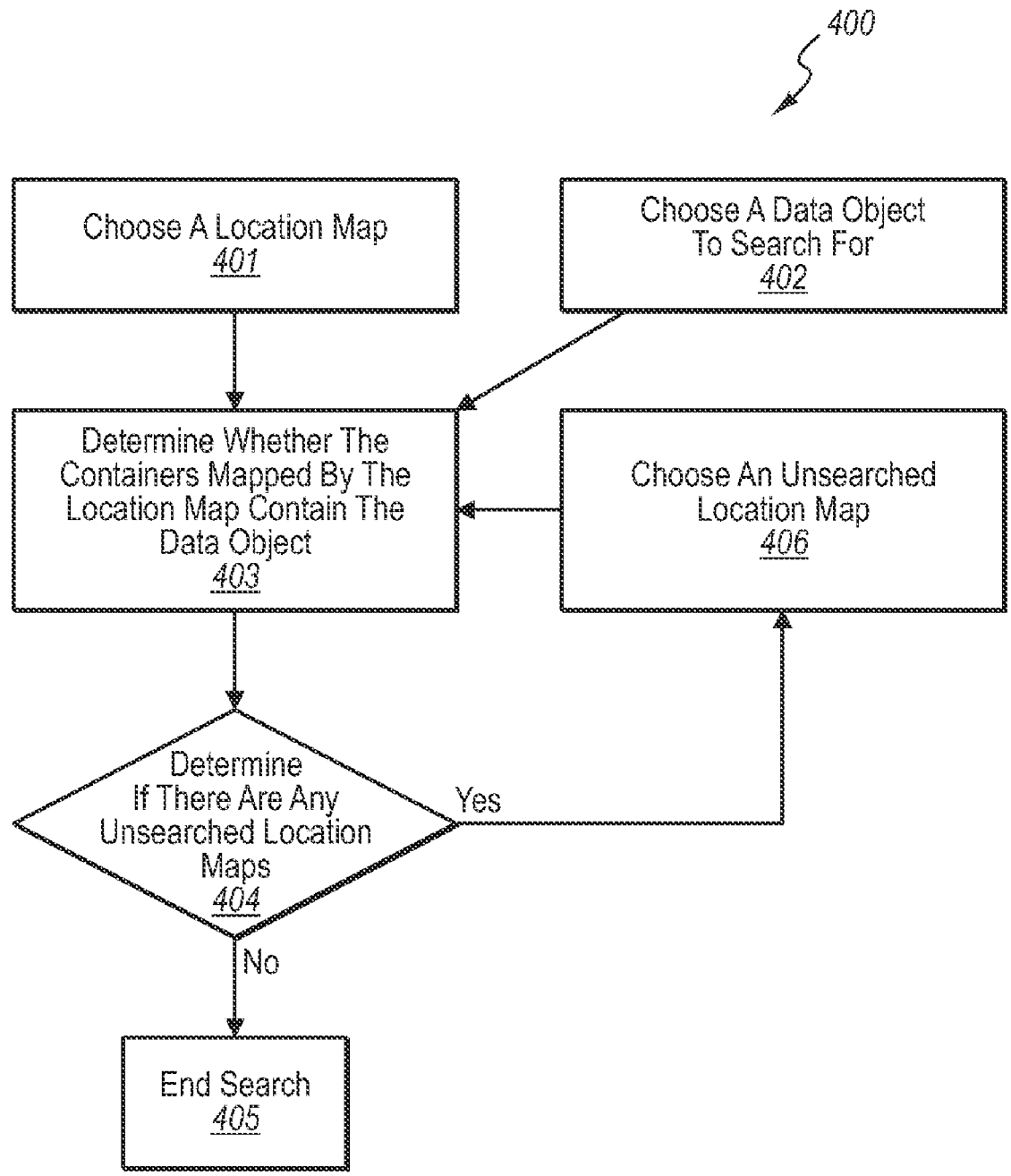
FIG. 4 illustrates a flowchart of a method for searching for a data object in a modular data storage system.

FIG. 4 illustrates a flowchart of a method 400 for locating a data object within a modular data storage system which contains more than one location map. The method 400 represents just one of several possible ways that data objects may be located in the modular data storage system. In order to locate a data object, the data object to be searched for is identified (act 402), and a suitable location map for use in locating that data object is selected (act 401). As an example only, the selected location map may be the location map most newly created, or perhaps the selected location map might be the oldest location map. As an additional example, the selected location map might be specified by a user or application.

After selecting a location map (act 401) and a data object (act 402), the selected location map is used to search for the data object in the containers mapped to by the location map (act 403). In other words, it is determined whether or not the containers mapped to by the selected location map contain the desired data object. For instance, suppose the data object is an e-mail message. The location map may be used by first hashing all or a portion of that e-mail message into a hash value. As an example, an e-mail address associated with the e-mail message may be hashed to generate a hash value. Regardless of what the data object is, or what the hash value is, the selected location map may then be evaluated to determine which container is mapped from that hash value. Then, that container may be searched for the desired e-mail message.

Next, after determining whether or not the container mapped to by the selection location map contains the data object, the method might then determine whether there are any unsearched location maps (decision block 404). If there are unsearched location maps (Yes in decision block 404), an unsearched location map is selected (act 406), and the corresponding container mapped to by that newly selected location map is identified. It is then determined whether or not that identified container contains the data object (decision block 403). If the container is the same container as was already searched in a prior iteration of decision block 403, then the prior results may be trusted without necessarily searching the same container again for the same data object. However, if the container has not yet been searched in a prior iteration of the decision block 403, then the newly identified container may be searched for the data object. The process might repeat until in one interaction of act 404, it is determined that all location maps have been searched, at which time the search may end (act 405). Optionally, the data object (e.g., the e-mail message) may be retrieved once found.

In other embodiments, the method 400 might be optimized. For example, if a data object is located in act 403, the method might end (act 405) without proceeding to act 404, thereby ending the search even if there are unsearched location maps remaining. In another example, the method might implement a cache to search location maps first which have been known to locate a data object previously. Of course, other optimizations are possible.

One skilled in the art will recognize, after having read this description, that in some embodiments all location maps might remain indefinitely, while in other embodiments the location maps might be removed when the data they map to is removed or is no longer valid. For example, in some embodiments the data objects might comprise SPAM e-mail messages that may only need to be stored in the modular data storage system for a finite amount of time.

Figure 6:
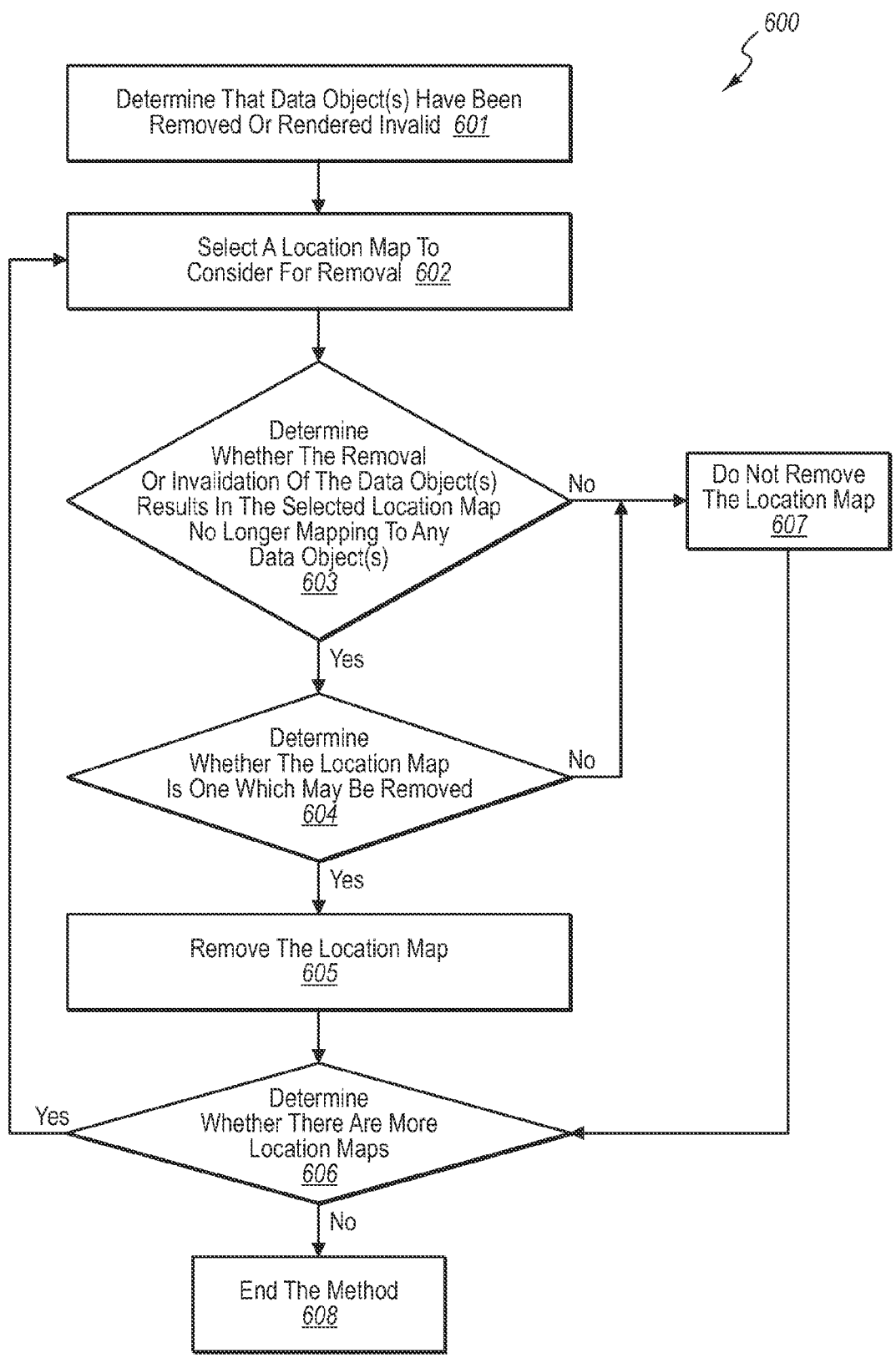
FIG. 6 illustrates a flowchart of a method for removing a location map from a modular data storage system that uses location maps.

In embodiments where data objects are removed, FIG. 6 illustrates a flowchart of an example method 600 for removing old location maps. For example, the method 600 might be initiated upon determining that data object(s) have been removed or are rendered invalid (act 601). Data object(s) may be determined to have been removed, for example, when it is determined that the data object(s) have been, or are to be, deleted. Further, determining that data object(s) have been rendered invalid can be accomplished in a variety of ways. For instance, some data objects are rendered invalid after the passage of a certain date, such as in a SPAM storage system where an e-mail message might become invalid after it has been stored for two weeks. A variety of methods are available for determining that data object(s) have been removed or are no longer valid, and as such, the examples described herein are not intended to or limit the scope of available methods.

After determining that data object(s) have been removed or are rendered invalid (act 601), a location map is selected to be considered for removal (act 602). In some cases, the location map which is selected is the newest location map, while in other cases the location map is the oldest location map. Of course, any arbitrary location map may also be selected. In one example, the location map which is selected is one which has not been previously selected by the method 600, at least during this iteration of the method 600 performed in response to the corresponding data object(s) having been removed or rendered invalid.

Next, the method 600 considers the selected location map (act 602) to determine whether the removal or invalidation of the data object(s) has caused the location map to no longer map to any valid data object(s) (decision block 603). In other words, the method determines whether the location map is still needed to access valid data object(s) stored in the containers. This decision may consider, for instance, characteristics of the data object(s) referenced by the location map, or it may consider characteristics of the location map itself, such as an expiration date associated with the location map. If the selected location map does map to valid data object(s) (No in decision block 603) then the location map is not removed (act 607).

In situations in which it is determined that the selected location map does not map to any valid data object(s) (Yes in decision block 603) then it is determined whether the location map is one which may be removed (decision block 604). In some instances, a location map may be of a type that is removable, while in other instances a location map may be of a type which is not removable. By illustration only, each location map could be associated with a flag which indicates whether the location map is removable. Then, in this example, this flag could be set on an old location map when a new location map is added, indicating that the old location map is removable when all data objects it references have been removed or are no longer valid.

Of course, if it is determined that the location map is of a type that is not removable (No in decision block 604), then the location map is not removed (act 607). Alternatively, if it is determined that the location map is removable (Yes in decision block 604), then the location map is removed (act 605). If, however, there is a system in which location maps are never to be removed, there is no need to perform the method 600 at all. If, on the other hand, there is a system which does not allow location maps to be retained if they no longer reference valid data objects, there would be no need for decision block 604. Instead, if the determined that the location map no longer maps to any valid data objects (Yes in decision block 603), the method proceeds directly to the removal of the location map (act 605).

The method 600 now determines whether there are more location maps to consider for removal (decision block 606). This determination is made both in cases where a selected location map was removed (act 605), and cases where the selected location map was not removed (act 607). As discussed, the location map may not have been removed due to previous decisions about the nature of the selected location map (decision blocks 603 and 604). If it is determined that there are still location maps to be considered for removal (Yes in decision block 606), then another location map is selected for consideration (act 602) and the decision process about that location map is carried out (acts 603-607 as previously described). If there are several location maps in the modular data storage system, this process may iterate several times. When there are no more location maps to be considered (No in decision block 606), then the method 600 ends (act 608).

Figure 5D:
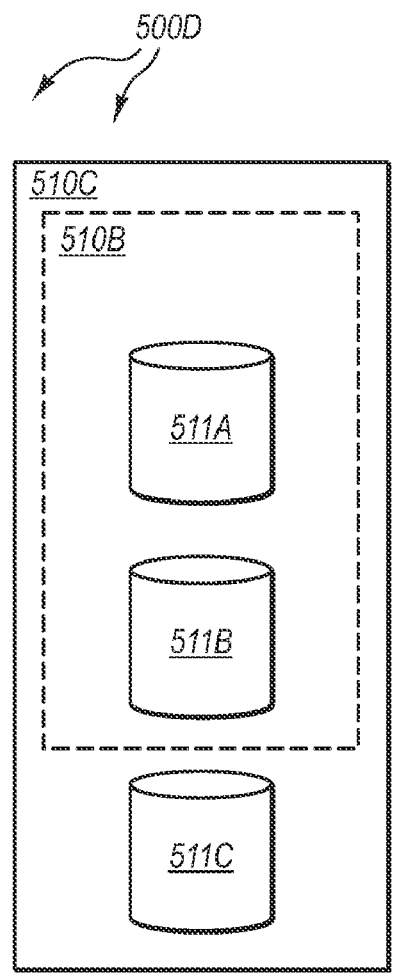
FIG. 5D illustrates an embodiment of removing an old location map from a modular data storage system that uses location maps.
Figure 5E:
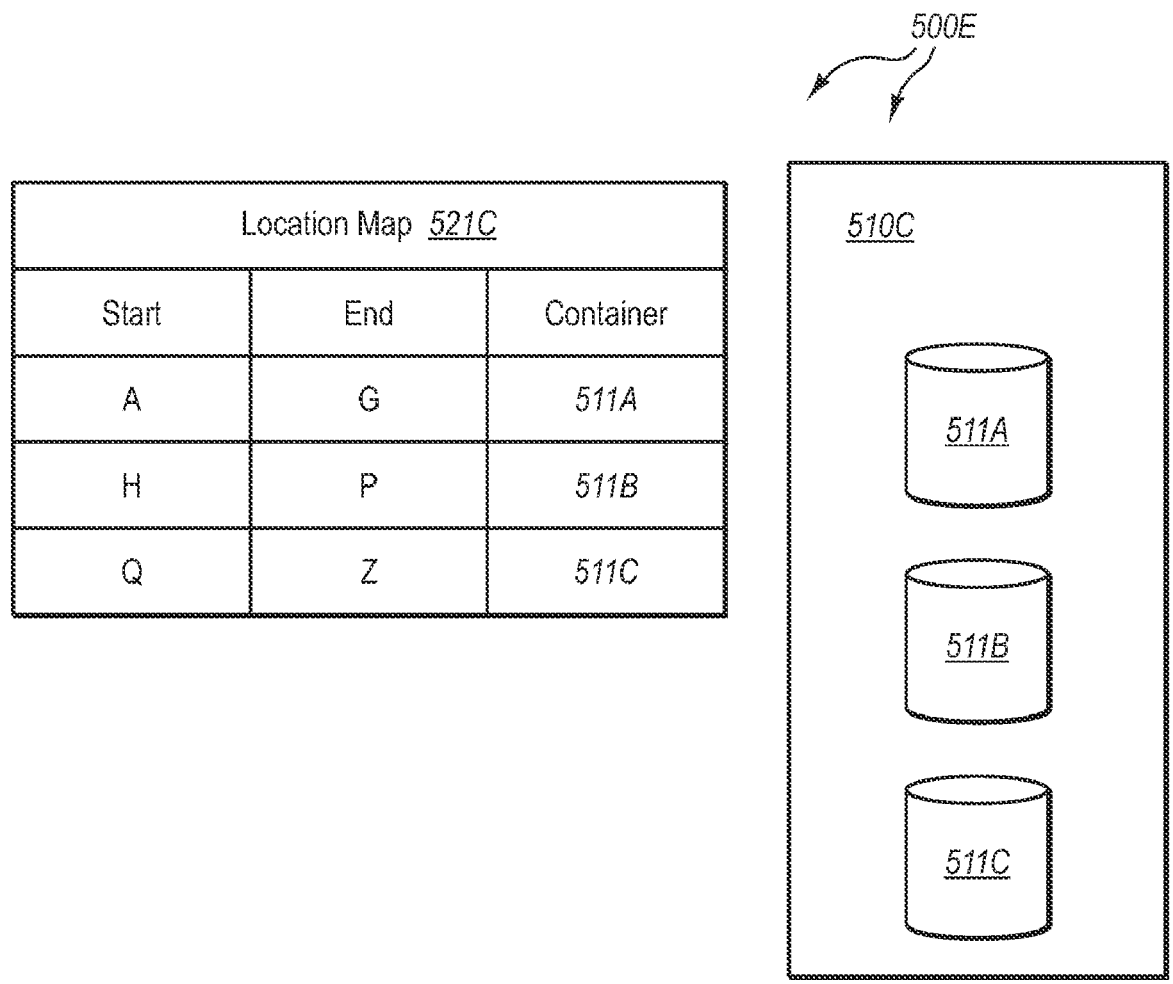
FIG. 5E illustrates an embodiment of removing an old location map from a modular data storage system that uses location maps.

In accordance with the method 600 for removing location maps, FIGS. 5D and 5E illustrate a fourth and a fifth state 500D and 500E of a modular data storage system in which invalid location maps have been removed. FIG. 5D represents the modular data storage system after it was decided that the location map 521A was no longer valid. In response, location map 521A was removed, leaving only location maps 521B and 521C. Consequently, with the removal of the location map the container set 510A was also removed, leaving only container sets 510B and 510C. In like manner, FIG. 5E represents the modular data storage system after a determination that location map 521B was no longer valid. Accordingly, location map 521B was removed, leaving only location map 521C and container set 510C.

Discussed previously, the method 300 can both expand and diminish the number of available containers in a modular data storage system. When diminishing the number of containers, the method 300 permits a graceful removal of container(s) without requiring data to be copied among containers and without rendering data objects unavailable for a period of time.

Figure 5F:
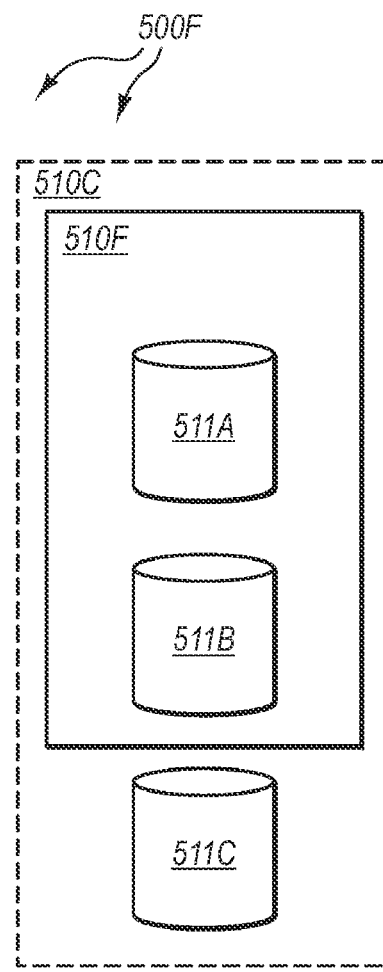
FIG. 5F illustrates an embodiment of diminishing the size of a modular data storage system that uses location maps.

FIG. 5F illustrates of a sixth state 500F of the modular data storage system after determining that the number of available containers will likely be diminished. As shown, container 511C will likely be removed, so a new container set 510F has been created. The new container set is a subset of the old container set 510C and is made up of only containers 511A and 511B. Accordingly, a new location map 521F has been created which matches the new container set 510F, and which maps the range of twenty-six hash values A through Z to only containers 511A and 511B.

To provide a clean removal of container 511C, the new location map 521F may be used exclusively to store new data objects stored only in containers 511A and 511B while the data storage system is in state 500F. Doing so ensures that no new data objects are placed in container 511C, allowing it to be removed as soon as any old data object(s) stored in it are removed or rendered invalid. Further, while in state 500F, both location maps 521C and 521F can be searched by the method 400 to locate any data object(s), maintaining the availability of the old data object(s) currently stored in the container 511C.

Figure 5G:
FIG. 5G illustrates an embodiment of removing an old location map from a modular data storage system that uses location maps when diminishing the size of the modular data storage system.
Figure 5G:
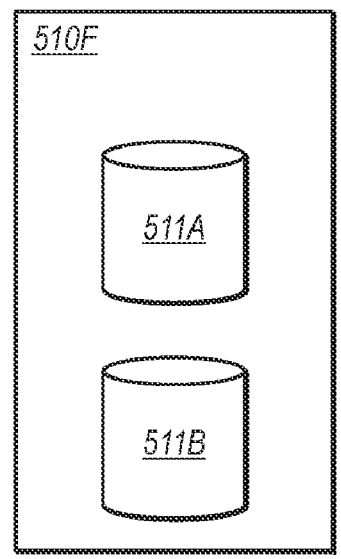

FIG. 5G completes the diminishing process with a seventh state 500G of the modular data storage system. As shown, the method 600 has determined that all data objects referenced by the location map 521C are no longer valid. As such, the method 600 removed the location map 521C, leaving only location map 521F with the container set 510F made up of containers 511A and 511B. The administrator may now safely remove container 511C from the modular data storage system without losing access to any data.

One skilled in the art will recognize, after having read this description, that there are cases in which many data objects may need to be removed from a modular data storage system concurrently. Discussed previously, for example, data objects may be removed according to criterion such as dates and times. In the case that there are many data objects which meet a criteria, the task of locating and removing each data object individually has the potential of being time- and computationally-intensive. The difficulty of the task is further complicated in a modular data storage system if the data objects are spread across multiple containers. That said, however, the modular nature of a modular data storage system, when implemented in accordance with embodiments contained herein, provides opportunities to optimize the removal of data objects. Accordingly, if the manner in which data objects are stored in the containers of the modular data storage system is optimized, then the removal of the data objects is optimized as well.

As an illustration, when data objects are stored in a modular data storage system their removal condition can be determined before storing the data objects. Then, data objects with a common removal condition can be stored together in a container created solely to store those data objects. Then, the modular nature of the modular data storage system allows the entire container storing grouped objects to be removed when the condition is met, thereby removing all data objects which meet the removal condition without needing to locate or even identify the data objects which should be removed.

Figure 7:
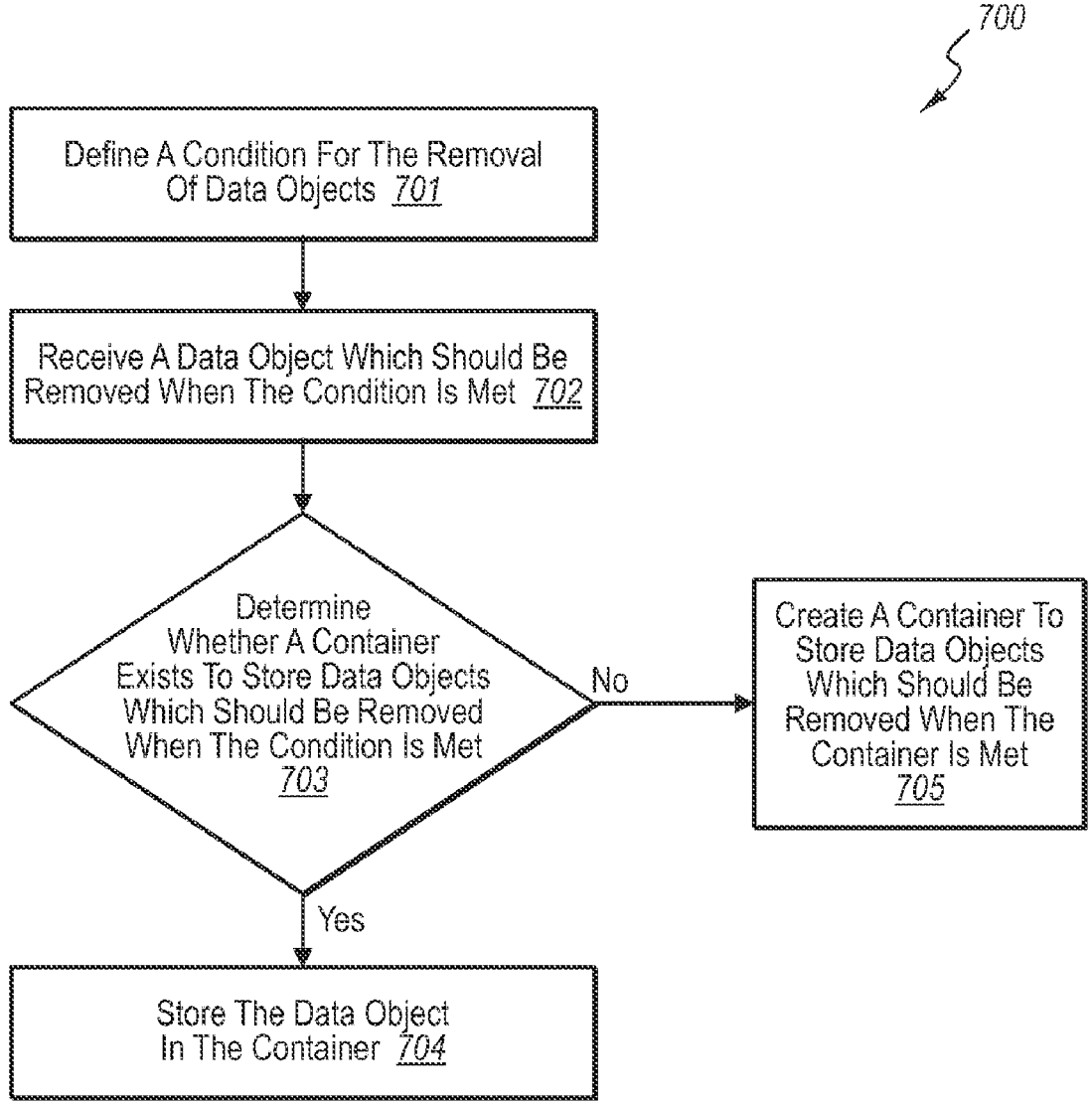
FIG. 7 illustrates a flowchart of a method for storing data objects which should be removed according to a condition in a modular data storage system whereby the act removing a plurality of objects when the condition occurs may be more efficient than removing each individual data object.

FIG. 7 illustrates a flowchart of a method 700 for storing data objects in a modular data storage system to enable efficient removal of the data objects. For example, the method begins by defining a condition which, when met, might lead to the removal of data objects (act 701). With the condition defined, a data object can be received which should be removed according to the condition (act 702). When a data object is received whose removal depends on the condition, the method 700 determines if a container currently exists for storing all data objects which are to be removed if the condition is met (decision block 703). If such a container does not currently exist (No in decision block 703), then it is created (act 705). If such a container already exists (Yes in decision block 703), or if that container was created (act 705), then the data object is stored in the container (act 704).

Figure 9A:
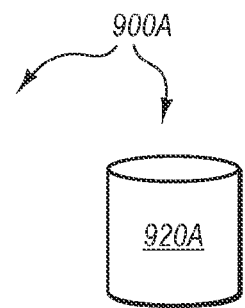
FIG. 9A illustrates an embodiment of storing a plurality of objects which should be removed according to a condition in a modular data storage system.

FIG. 9A illustrates a first state 900A of a modular data storage system adapted for grouping data objects to be removed according to a condition into separate containers. For example, a mapping table 910 may contain a mapping which associates a container 920A to a condition 930A. In other words, if the condition 930A occurs, the container 920A is to be removed, thereby also removing all of the data objects stored in the container 920A.

Figure 9B:
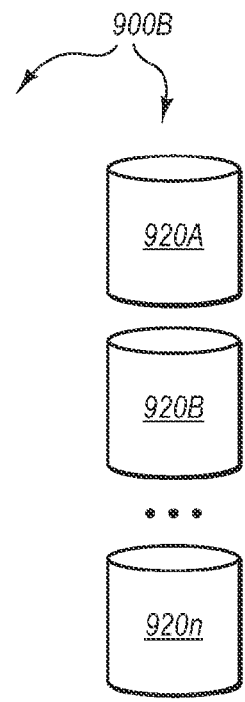
FIG. 9B illustrates an embodiment of adding an object which should be removed according to a condition in a modular data storage system.

In the broader sense, the method 700 for storing data objects can create any number of containers associated with any number of conditions. For example, FIG. 9B illustrates a second state 900B in which multiple containers along with respective container/condition mappings have been added to the modular data storage system. As shown, the mapping table 910 now contains a new mapping which maps container 920B to condition 930B. Also as shown, any number of containers 920n and conditions 930n may exist.

Figure 8:
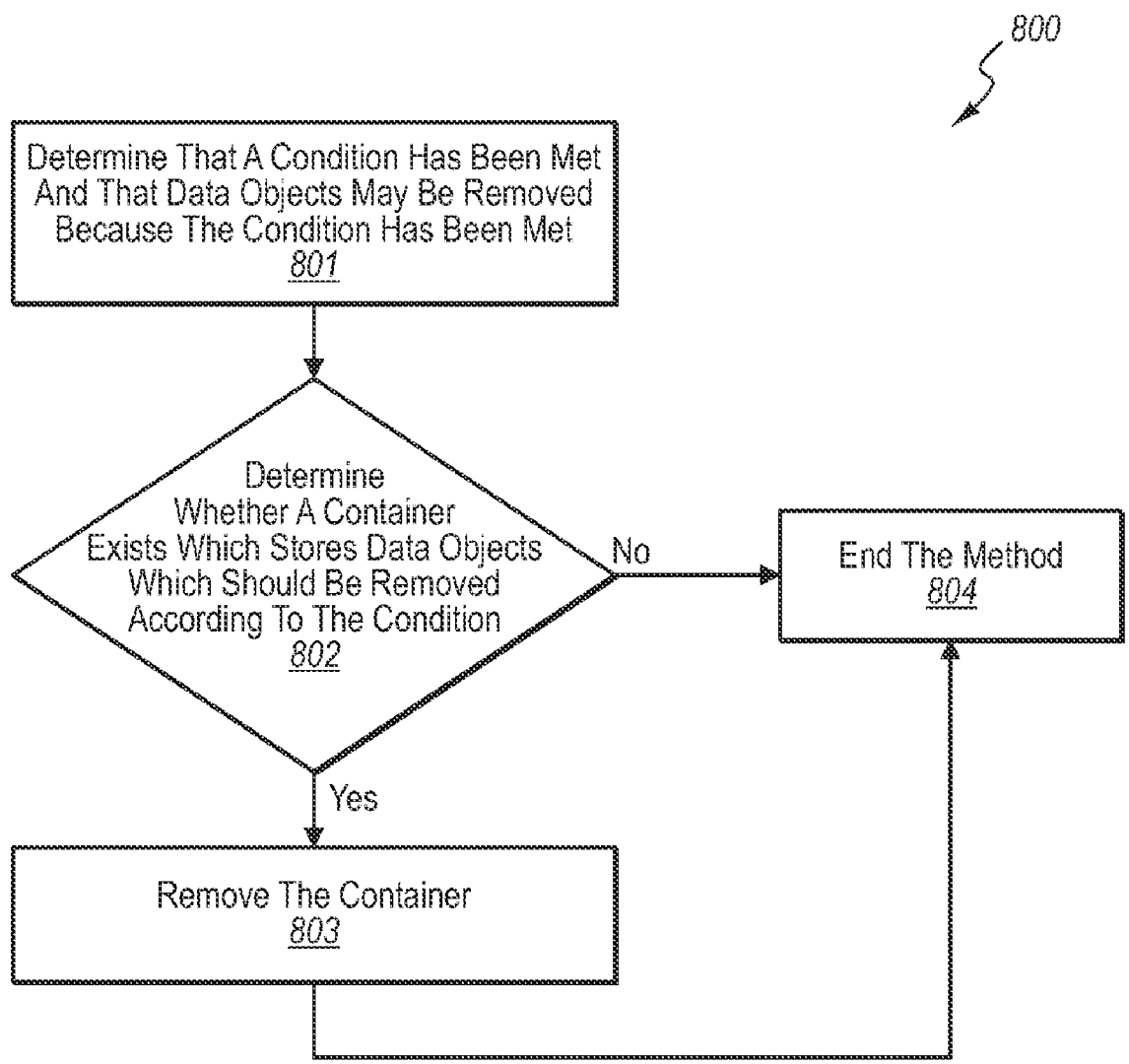
FIG. 8 illustrates a flowchart of a method for removing a plurality of data objects from a modular data storage system when a condition occurs wherein the act removing the plurality of objects may be more efficient than removing each individual data object.

Completing the process, FIG. 8 illustrates a flowchart of a method 800 for removing data objects which meet a condition. To start, it is determined that a condition has been met and that, as a result, data objects may need to be removed (act 801). More generally, it may also be determined that the condition has changed since it was defined. In that case, it may be determined that the changed condition has been met and that, as a result, data objects may need to be removed. For example, if the condition was an expiration date it may be determined that policies governing expiration dates has changed and that data objects may need to be expired at a different time than when they were stored. Thus, a container that previously had an expiration condition date of Nov. 1, 2008 at the time the container was created, may later have that expiration condition postponed until Dec. 1, 2008. For instance, perhaps an IT administrator decided to keep spam around for one additional month to allow users additional time to filter through spam to find e-mail incorrectly categorized as spam.

After determining that data objects may be removed according to a condition, it is determined whether a container exists which stores the data objects which should be removed according to the condition (decision block 802). Of course, the container which is identified may instead be a container associated with a changed condition. For example, the mapping table 910 may be queried to determine whether the container exists. If it is determined that a container does exist which stores the data objects to be removed because the condition has been met (Yes in decision bock 802), the container is removed (act 803) and the method 800 ends (act 804). Otherwise (No in decision bock 802), the method 800 ends (act 804) without removing any container.

At times the containers which store the data objects may be volumes, and the act of removing a container may delete a volume. At other times, the containers which store the data objects may be tables in a database, and the act of removing a container may drop a table. One skilled in the art will recognize that various other types of containers and removal methods are available. Further, after having read this description, one skilled in the art will recognize that to be efficient, the act removing a container should, in some cases, be faster than the act of removing many data objects individually. However, there may also be cases in which a slower removal of a container may be acceptable.

Figure 9C:
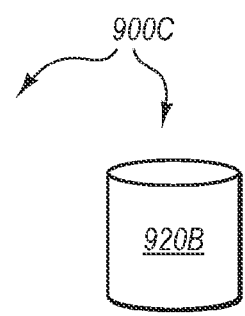
FIG. 9C illustrates an embodiment of removing a plurality of data objects from a modular data storage system when a condition occurs wherein the act removing the plurality of objects may be more efficient than removing each individual data object.

Reflecting the method 800, FIG. 9C illustrates a third state 900C in which containers have been removed from the modular data storage system. For instance, assume that the second state 900B contained only containers 920A and 920B and conditions 930A and 930B. The third state 900C illustrates the state after it was determined that the condition 930A had been met, and after the method 800 removed the container 920A.

Figure 10:
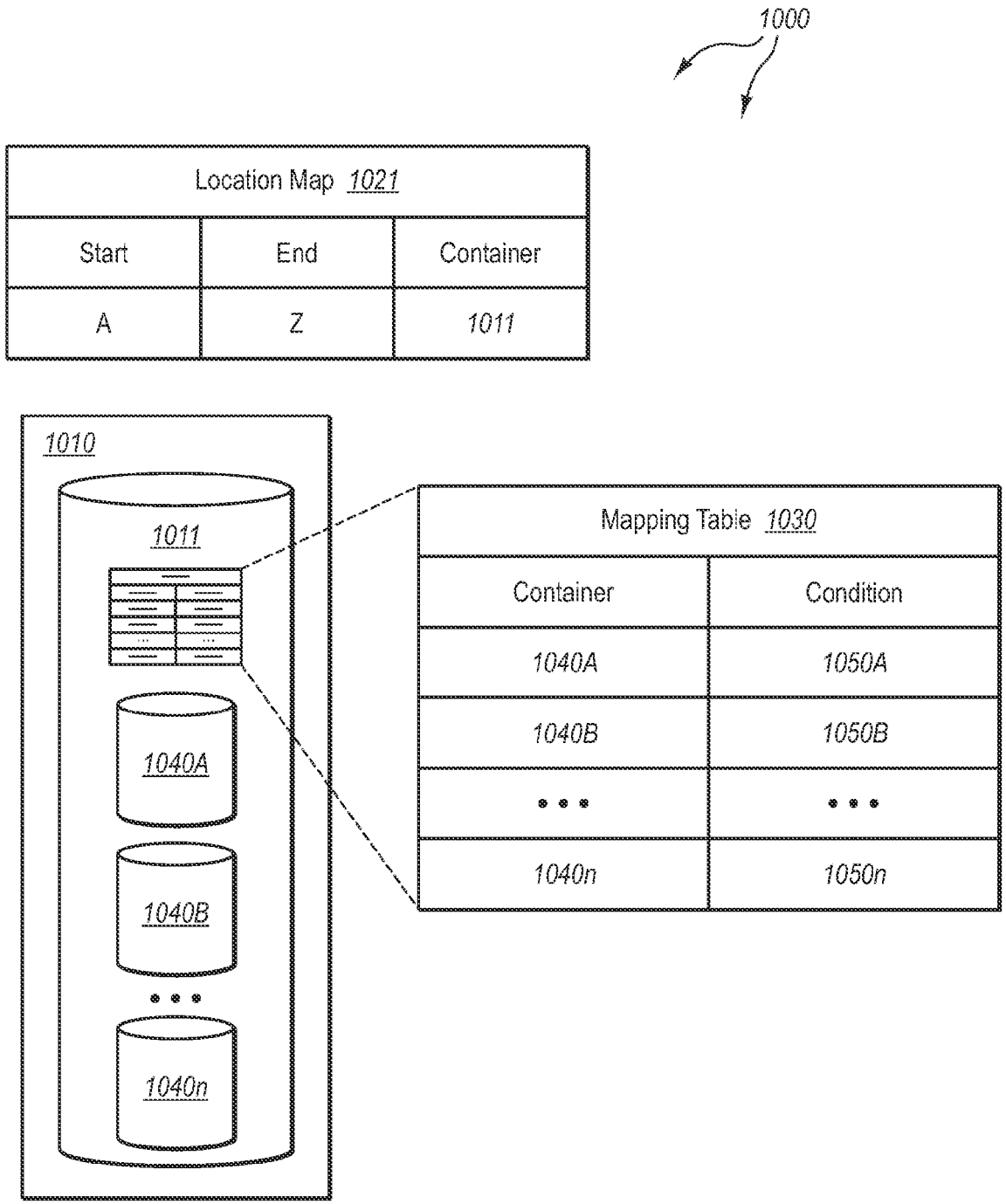
FIG. 10 illustrates an embodiment of storing a plurality of data objects which should be removed according to a condition in a modular data storage system that uses location maps.

In some embodiments, the containers (e.g. 920A-920n) and the mapping table (e.g. 910) used to group data objects to be removed according to a condition (e.g. 930A-930n) might be implemented within or in conjunction with the containers (e.g. 511A-511C) associated with the location maps (e.g. 521A-521C and 521F). To clarify, FIG. 10 illustrates a modular data storage system which contains a location map 1021 which maps data objects to a set of containers 1010 containing a single container 1011. Additionally, however, the modular data storage system also associates the container 1011 with a mapping table 1030 and containers 1040A-1040n for storing data objects which should be removed according to a condition. Such a modular data storage system combines the benefits of the ability to flexibly augment or diminish the number of containers in the data storage system with the ability to efficiently store and remove data objects according to conditions.

In a particular embodiment, and not to limitation, the modular data storage system may store spam e-mail messages, and the condition for removal may be expiration dates. For example, the location map 1021 may be a hash map which uses a hash of an e-mail address to determine a container, such as container 1011, in a container set 1010 in which to store a spam e-mail message. Then, each container, such as container 1011 in the container set 1010, contains a mapping table 1030 which maps to enough sub-containers 1040A-1040n to store spam e-mail messages for each day of a month.

Accordingly, the principles described herein provide an effective mechanism for efficiently managing modular data storage systems. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for efficiently managing a modular data storage system which stores a plurality of data objects, the method comprising:

an act of determining that a first plurality of containers is available for storing a plurality of data objects, wherein the plurality of data objects comprises e-mail messages, and wherein the number and identity of the plurality of data objects is subject to change;

an act of defining a previous set of one or more location maps associated with the data storage system, wherein the previous set of one or more location maps deterministically maps the plurality of data objects to a corresponding one or more containers of the first plurality of containers;

an act of using the previous set of one or more location maps to store at least some of the plurality of data objects in respective containers of the first plurality of containers;

an act of determining that there has been or is to be a change in the availability of containers of the first plurality of containers to a subsequent second plurality of containers that is available for storing the plurality of data objects;

an act of defining a second location map associated with the data storage system, wherein the second location map deterministically maps the plurality of data objects to a corresponding one or more containers of the second plurality of containers, wherein the second plurality of containers may, but need not, at least partially overlap the first plurality of containers such that one or more containers may be members of both the first and second plurality of containers;

an act of using the second location map to store at least some of the plurality of data objects in respective containers of the second plurality of containers; and an act of searching for at least one data object stored in the first or second plurality of containers, comprising:

an act of using at least one of the previous set of one or more location maps to determine whether the at least one data object is stored in the first plurality of containers; and an act of using the second location map to determine whether the at least one data object is stored in the second plurality of containers.

2. The method in accordance with claim 1, wherein the previous set of one or more location maps and the second location map each comprises at least one hash map.

3. The method in accordance with claim 2, wherein the hash maps store hashes of e-mail addresses corresponding to e-mail messages stored in the data storage system.

4. The method in accordance with claim 1, wherein the e-mail messages comprise spam e-mail messages.

5. The method in accordance with claim 1, further comprising the act of determining when a data object is no longer valid.

6. The method in accordance with claim 5, further comprising the act of removing at least one of the previous set of one or more location maps when it is determined that all of the data objects deterministically mapped by the removed location map are no longer valid.

7. The method in accordance with claim 1, wherein the change in the availability of containers of the first plurality of containers comprises adding one or more containers to the first plurality of containers to create the second plurality of containers, and wherein the second plurality of containers comprises the first plurality of containers together with the added one or more containers.

8. The method in accordance with claim 7, wherein the act of defining the second location map occurs after the one or more containers have been added to the first plurality of containers to create the second plurality of containers.

9. The method in accordance with claim 1, wherein the change in the availability of containers of the first plurality of containers comprises removing one or more containers from the first plurality of containers to create the second plurality of containers, and wherein the second plurality of containers comprises the first plurality of containers minus the removed one or more containers.

10. The method in accordance with claim 9, wherein the act of removing the one or more containers occurs after defining the second location map and after removing all location maps which deterministically map objects to the one or more containers which are being removed.

11. A method for efficiently administering a spam quarantine system which stores a plurality of spam e-mail messages, the method comprising:

an act of determining that a first plurality of containers is available for storing a plurality of spam e-mail messages, wherein the number and identity of the plurality of spam e-mail messages is subject to change;

an act of defining a first hash map associated with the spam quarantine system, wherein the first hash map defines a range of hash values which are distributed across the first plurality of containers, and wherein the first hash map deterministically maps each hash value of the range of hash values to one container of the first plurality of containers;

an act of using the first hash map to store at least some of the plurality of spam e-mail messages in respective containers of the first plurality of containers;

an act of determining that one or more containers has been or will be added to the first plurality of containers to define a subsequent second plurality of containers that is available for storing the plurality of spam e-mail messages;

an act of defining a second hash map associated with the spam quarantine system, wherein the second hash map defines a same range of hash values defined by the first hash map but which are distributed across the second plurality of containers, and wherein the second hash map deterministically maps each hash value of the same range of hash values to one container of the second plurality of containers, and further wherein the second plurality of containers may, but need not, at least partially overlap the first plurality of containers such that one or more containers may be members of both the first and second plurality of containers;

an act of using the second hash map to store at least some of the plurality of spam e-mail messages in respective containers of the second plurality of containers;

an act of searching for at least one of the plurality of spam e-mail messages stored in the first or second plurality of containers, comprising:

an act of using the first hash map to determine whether the at least one of the plurality of spam e-mail messages is stored in the first plurality of containers; and an act of using the second hash map to determine whether the at least one of the plurality of spam e-mail messages is stored in the second plurality of containers;

an act of determining that the first hash map is no longer valid when all data objects mapped by the first hash map are determined to no longer be valid; and in response to determining that the first hash map is no longer valid, an act of removing the first hash map.

* * * * *